US012334639B2

(12) United States Patent
Levin et al.

(10) Patent No.: US 12,334,639 B2
(45) Date of Patent: Jun. 17, 2025

(54) LOW-PROFILE WIDEBAND ANTENNA WITH CONTROLLED RADIATION PATTERN

(71) Applicants: Eduard Levin, Thornhill (CA); Vladimir Iskiv, Mississauga (CA); Andrew Schekaturin, Niagara Falls (CA); Eugene Rozumovich, Niagara Falls (CA)

(72) Inventors: Eduard Levin, Thornhill (CA); Vladimir Iskiv, Mississauga (CA); Andrew Schekaturin, Niagara Falls (CA); Eugene Rozumovich, Niagara Falls (CA)

( * ) Notice: Subject to any disclaimer, the term of this patent is extended or adjusted under 35 U.S.C. 154(b) by 126 days.

(21) Appl. No.: 18/445,177

(22) Filed: May 11, 2023

(65) Prior Publication Data

US 2024/0380120 A1 Nov. 14, 2024

(51) Int. Cl.
*H01Q 15/23* (2006.01)
*H01Q 21/06* (2006.01)

(52) U.S. Cl.
CPC .......... *H01Q 15/23* (2013.01); *H01Q 21/067* (2013.01)

(58) Field of Classification Search
CPC .......................... H01Q 15/23; H01Q 21/067
See application file for complete search history.

(56) References Cited

U.S. PATENT DOCUMENTS

2017/0149134 A1* 5/2017 Klemes ............. H01Q 21/0031

FOREIGN PATENT DOCUMENTS

WO WO-2019196017 A1 * 10/2019 .......... H01Q 1/1235
WO WO-2021039362 A1 * 3/2021 ............ H01Q 21/20

* cited by examiner

*Primary Examiner* — Hoang V Nguyen

(57) ABSTRACT

An extremely broadband compact antenna is provided with a plurality of passive elements mounted evenly spaced is a circular pattern on a grounded electrical conductive round plate. The circular pattern is on a circle concentric and spaced from cylindrical active elements mounted at the center of the plate. A plurality of director elements are mounted in an evenly spaced manner around the periphery of the plate. The number, shape, and location of the passive and director elements are variable to provide various selected signal radiator patterns for various applications.

6 Claims, 11 Drawing Sheets

LOW-PROFILE WIDEBAND ANTENNA WITH CONTROLLED RADIATION PATTERN

FIELD OF THE INVENTION

This invention relates to extremely broadband compact antenna array structures. It also concerns electromagnetic radiation transmission methods, as well as apparatuses related to antenna configurations allowing for controlled narrow, directional, and omnidirectional communication capabilities, up to 360° in azimuth and vertical planes.

BACKGROUND OF THE INVENTION

Multiple-antenna radio systems generally use several antennas at the transmitter and/or receiver to improve communication performance. Such multiple-antenna systems are commonly referred to as multiple-antenna radio systems, used in wireless communications as these systems may offer significant increases in data throughput and link range without additional bandwidth of transmission power. Few-element adaptive antenna arrays based on broadband elements allow one to control the radiation pattern of the antenna system (i.e. change the direction of the main beam, the shape of the radiation pattern, and form the minima of the radiation pattern in given directions). Such technical solutions would render it possible to minimize or eliminate the associated visual and electromagnetic interference in forming a spatial selection of communication channels.

SUMMARY OF THE INVENTION

It is a principal object of the present invention to provide multi-element antenna systems having wideband controlled directivity.

It is another object of the present invention to provide an antenna system generally including a grounded plate and two or more signal radiator elements coupled electrically to an antenna commutator and mechanically to the grounded plate.

It is another object of the present invention to provide highly broadband multi-functional automotive or personal antenna that can be used for direct field and urban communications solutions, minimizing and even eliminating associated visual and electromagnetic interference.

It is another object of the present invention to provide low-profile wideband antennas that are uni-phased arrays and configurated with different types and numbers, of array of signal radiator elements to allow it to be implemented in wide applications.

It is still another object of the present invention to provide antennas that are broadband, and is designed to receive and transmit HF, UHF, and SHF radio signals It is still yet another object of the present invention to provide antenna systems that are compact in size, and are applicable for stationary and mobile radio communication systems.

Briefly the broadband antenna of the present invention comprises a grounded electrically conductive plate. A cylindrical active radiator dipole element is mounted at the center of the top surface of conductive. A plurality of supplementary passive elements are mounted in an evenly spaced pattern on a circle soncentric and spaced from the cylindrical active element. A plurality of director elements are mounted in an evenly spaced manner around the periphery of the conductive plate. The number, shape and location of the supplementary elements and director elements may be varied to obtained selected predetermined radio transmission signal patterns.

BRIEF DESCRIPTION OF THE DRAWINGS

Other objects and advantages of the present invention will become apparent from the following detailed description of the preferred embodiments thereof in connection with the accompanying drawings, in which.

DETAILED DESCRIPTION OF THE PREFERRED EMBODIMENTS

Other objects and advantages of the present invention will become apparent from the following detailed description of the preferred embodiments thereof in connection with the accompanying drawings.

The present invention provides a class of low-element adaptive antenna arrays assembled from broadband elements, which allows on to control the antenna system signal radiation pattern (i.e. change the direction of the main beam, the shape of the radiation pattern, and form the minima of the radiation pattern in given directions) while providing sufficiently high gains with good coordination with the receiving transmitting path. At the same time, the antenna does not contain delay lines, using phase-shifting elements, which usually provide the required basic parameters of the antenna such as: gain, radiation pattern, standing wave ratio, among others.

Figure 1:
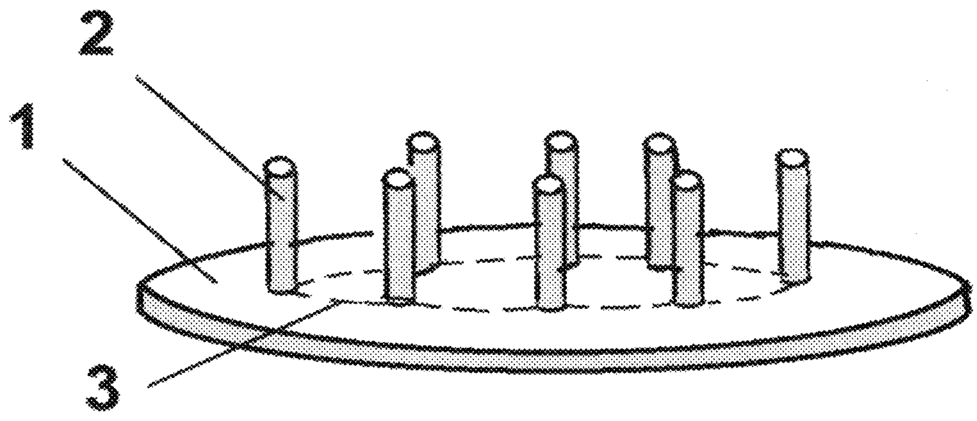
FIG. 1 is a top and front perspective view of a common basic low-element antenna having a plurality of quarter-wave radiator rods placed around a circular pattern on the surface of a circular reflective plate. The data throughput of which is determined by the antenna tuning frequency.
Figure 2:
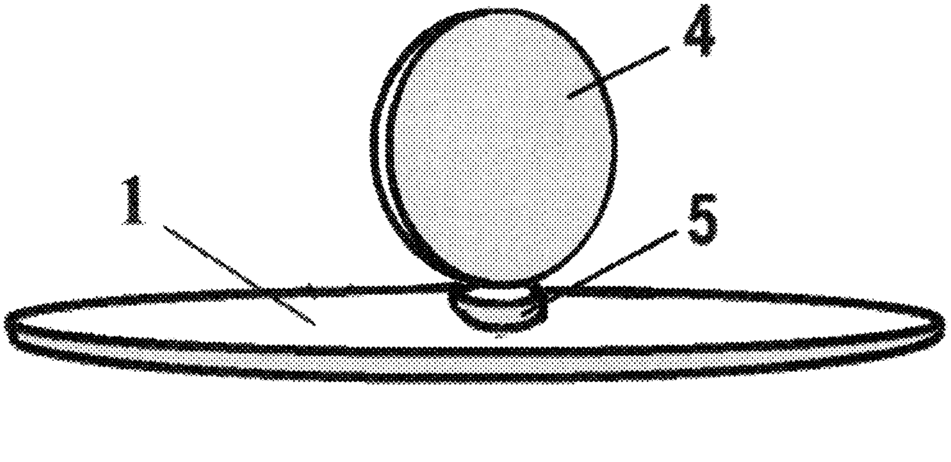
FIG. 2 is a top and front perspective view of a common antenna having a round disk active heat sink made of a flat electrically conductive copper plate. The heat sink is mounted on a connector and isolated from the supporting reflective surface.
Figure 3:
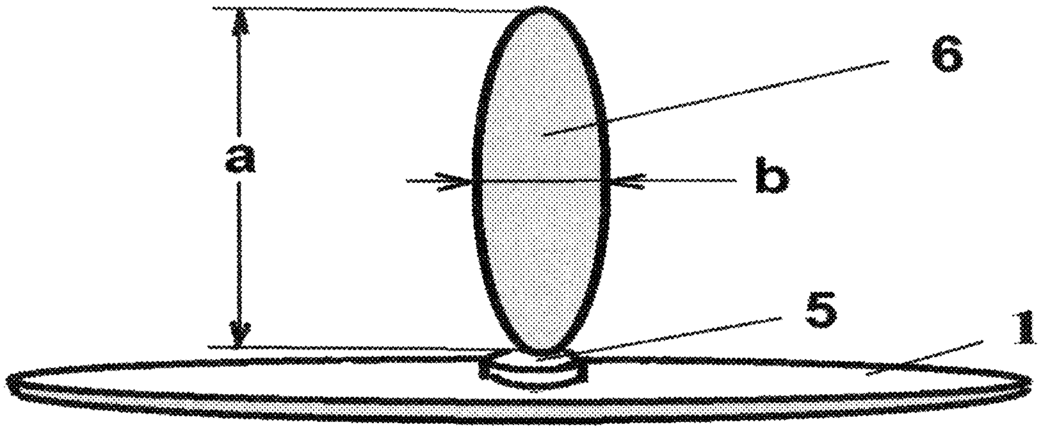
FIG. 3 is a top and front perspective view of another known antenna having an elliptical shape disk active heat sink made of a flat electrically conductive copper plate. The heat sink is mounted on a connector and it is electrically isolated from the reflective surface.
Figure 4:
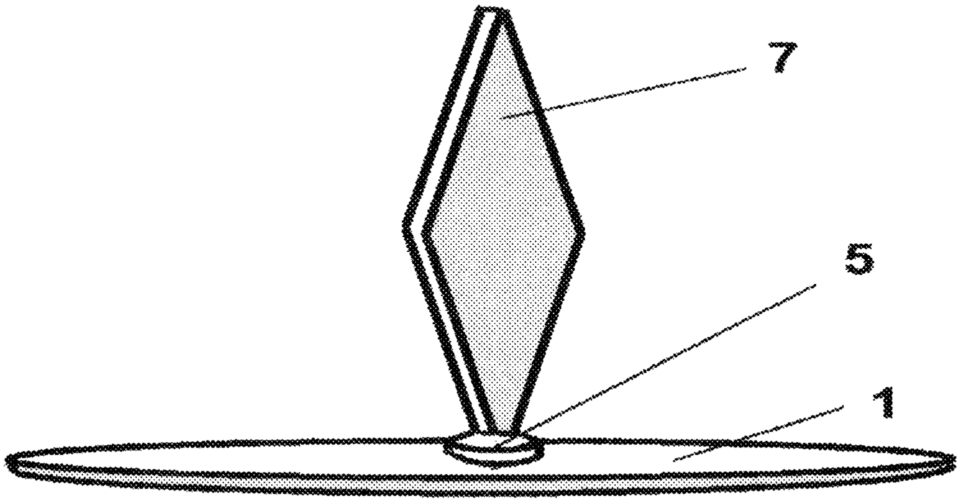
FIG. 4 is a top and front perspective view of another known antenna having a patel shape disk active heat sink made of a flat electrically conductive copper. The patel shaped radiator is mounted on a connector and it is electrically isolated from the reflective surface.
Figure 5:
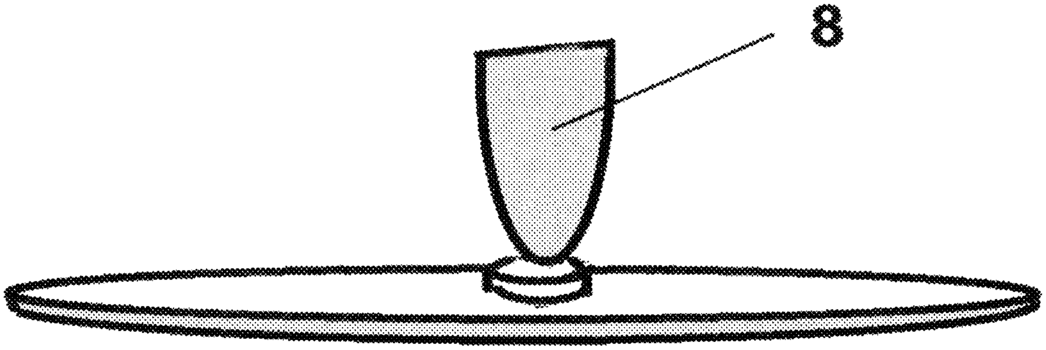
FIG. 5 is s top snd front perspective view of yet another antenna having a half elliptical shape active flat radiator plate element made of electrically conductive copper. The heat sink of the radiator plate element is mounted on a connector and it is electrically isolated from the reflective surface.
Figure 6:
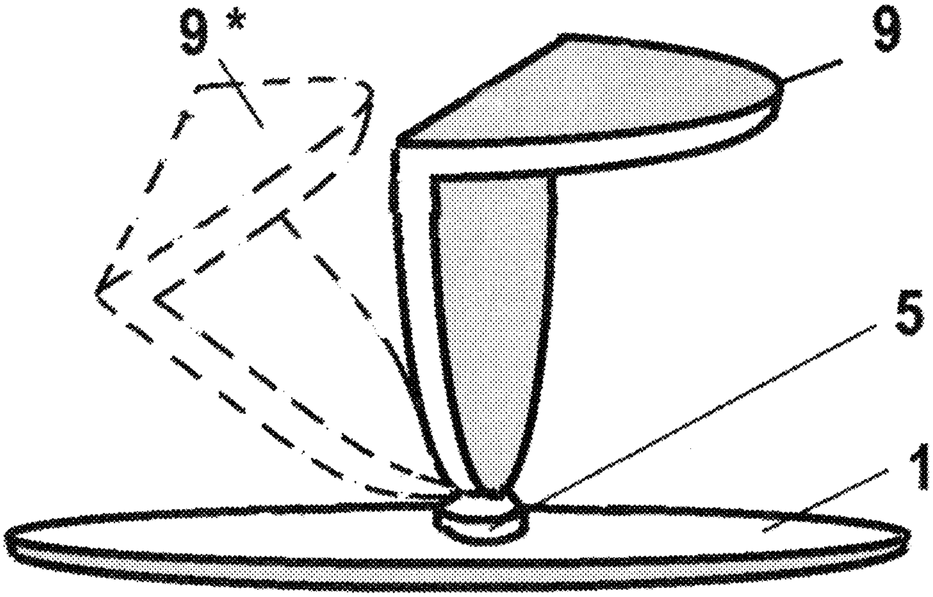
FIG. 6 is a top and front perspective view of still another known antenna having an L-shaped active radiator plate element made of electrically conductive copper. The heat sink of the radiator plate element is mounted on a connector and it is electrically isolated from the reflective surface.
Figure 7:
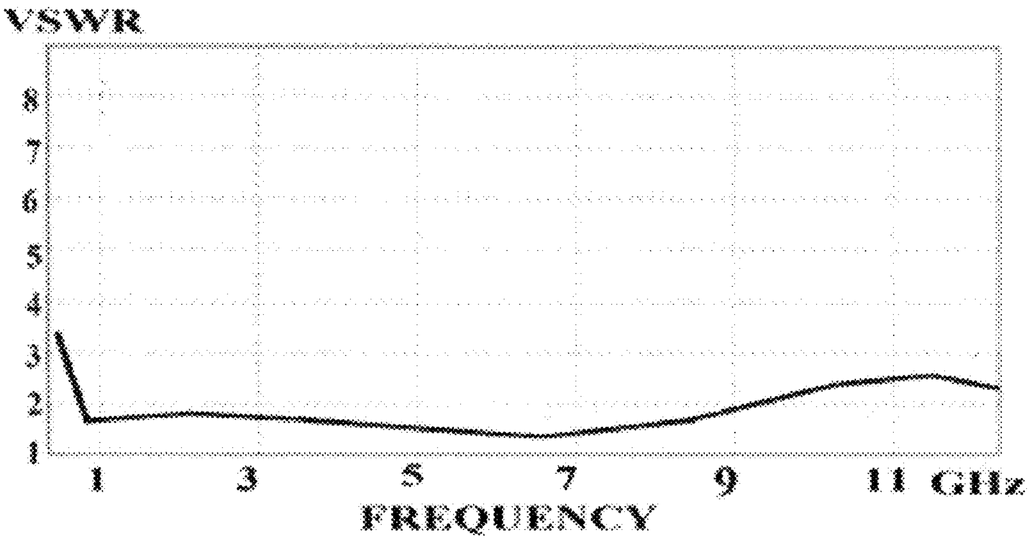
FIG. 7 is a VSWR (voltage standing wave ratio) versus transmission frequency graph of the antenna of the single elliptical element of FIG. 3.
Figure 8:
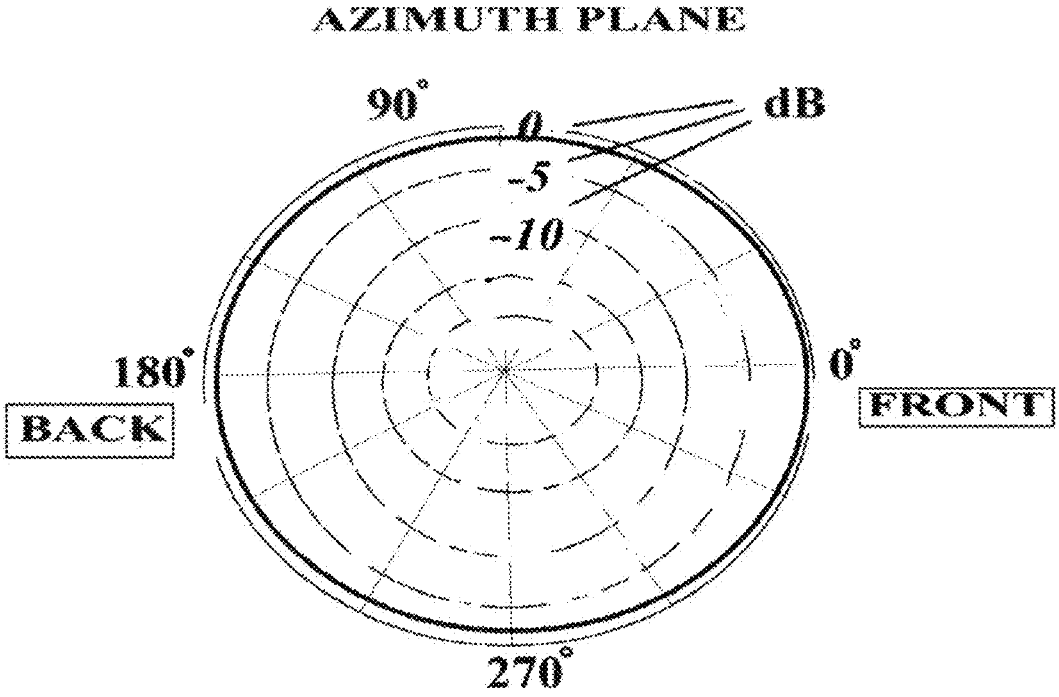
FIG. 8 is radiation pattern in the horizontal azimuth plane for an antenna of a single active element mounted on a reflective surface as shown in FIGS. 1 through 6.

A well-known solution of a small-element antenna is shown in FIG. 1 in which an electrically conductive disk 1 has a plurality of cylindrical radiator elements 2 mounted in a circumference in a circular pattern on a circular conductive reflective plate 3. The antenna elements 2 are quarter-wave (¼ wave) mono-poles. Such antenna are nevertheless narrow-band and their practical application is limited. The logical way to design broadband antenna is to replace the ¼ wave active elements with broadband vibrators of various shapes as shown in FIGS. 2 to 6. A round disk shape element 4 is mounted with an insulating connector 5 on the top surface of the reflective plate 3. Alternatively, an elliptical shape element 6 having dimensions of a vertical a-major axis and a horizontal b-minor axis as shown in FIG. 3 can be provided to allow the possibility of placing a larger number of elements on a reflective surface, which allows one to select the necessary electrical parameters of the antenna: directivity, gain, and impedance. Another type of active element is a petal shape disk 7 as shown in FIG. 7. In order to reduce the height of the antenna, the elliptical disk 6 can be cut in height to a half elliptical shape disk 8 as shown in FIG. 5. Another variant of the active element is an L-shaped element 9 as shown in FIG. 6 which provides both decreased height of the antenna and an increase in the number of elements that can be provided on the reflective surface 3. The antenna broadband is illustrated in the graph of FIG. 7, which shows that the change in the standing wave ratio in the range from 0.6 Ghz to 9 Ghz does not exceed 2. The radiation patterns of a single-element antenna are shown in FIG. 8 for the horizontal azimuth plane and in FIG. 9 for the vertical plane.

Figure 9:
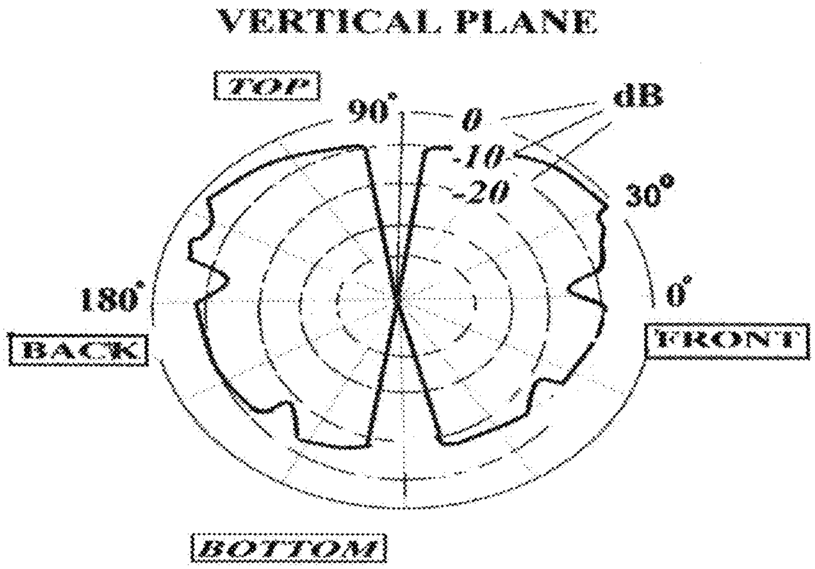
FIG. 9 is a radiation pattern of an antenna in the vertical plane for an antenna of a single active element mounted on a reflective surface as shown in FIGS. 1 through 6.
Figure 10:
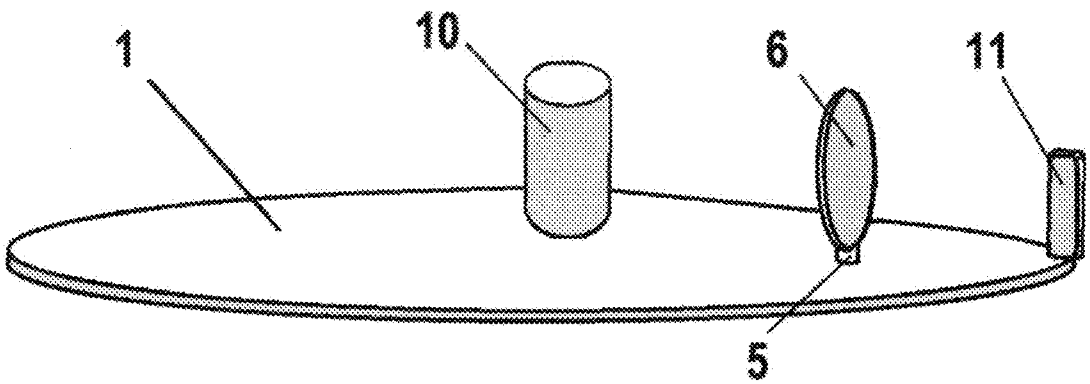
FIG. 10 is a top and front perspective view of an antenna having a single active element, a passive radiator and a director mounted on a refective surface.
Figure 11:
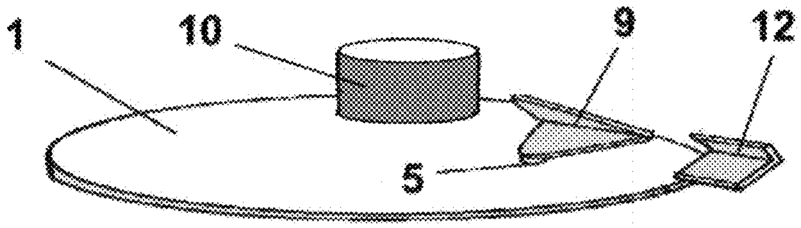
FIG. 11 is a top and front perspective view of an antenna having a single active element, a passive V-shaped radiator and an L-shaped director mounted on the surface of a grounded plate.
Figure 12:
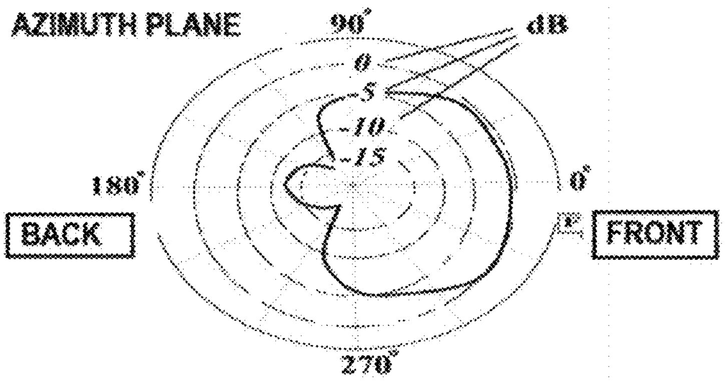
FIG. 12 is a radiation pattern in a horizontal azimuth plane of the antenna shown in FIGS. 10 and 11.
Figure 13:
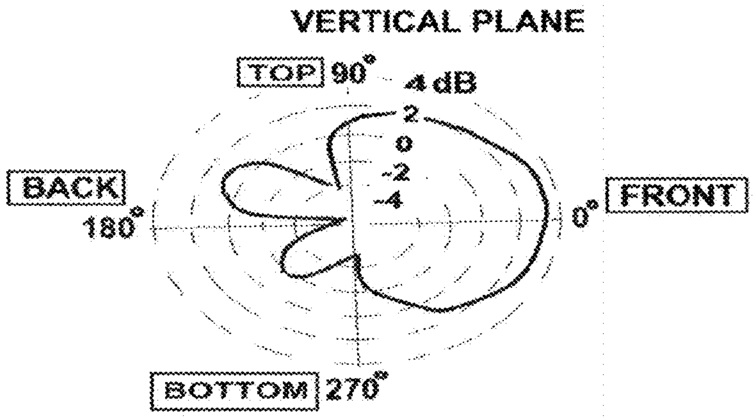
FIG. 13 is a radiation pattern in a vertical plane of the antenna shown in FIGS. 10 and 11.

As shown in the graphs, the antenna has an isotropic radiation pattern in a plane parallel to the reflective surface and with minima in a plane perpendicular to it. It should be kept in mind that the drawing and graphs given hereinafter are obtained as examples for the main dimensions on the reflective surface from 30 cm to 120 cm, with element height from 12 cm to 28 cm and varying significantly depending on the required bandwidth. As shown in FIG. 9, the maximum radiation pattern is directed at an angle of 30 degrees from the reflective surface, which significantly limits the scope of the antenna. To rotate the radiation pattern parallel to the reflective surface, it is necessary to add additional elements to the design of the antenna as shown in FIG. 10, such as passive radiator 10 and director 11. A variant of the antenna with a V-shaped active element 9 and passive radiators 10 and director 12 is shown in FIG. 11. The radiation patterns of a single-element antenna are shown in FIG. 12 for the azimuth and in FIG. 13 for the vertical planes.

Figure 14A:
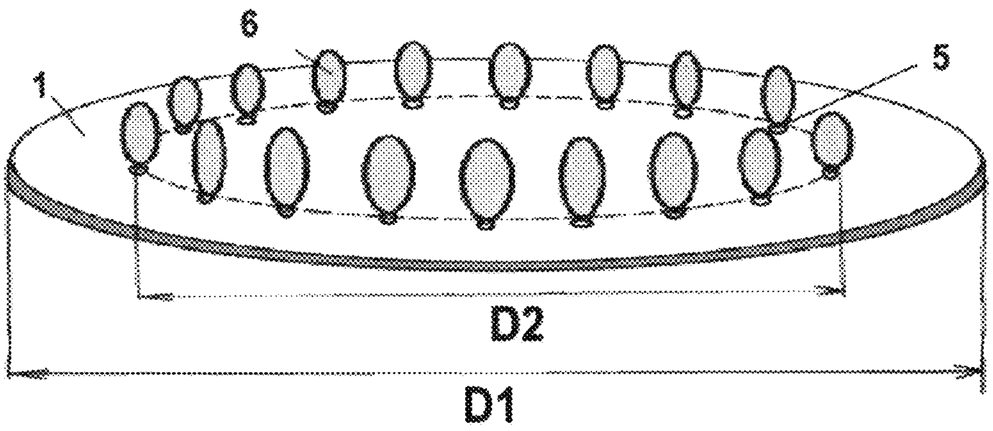
FIG. 14*a* is a top and front perspective view of a basic embodiment of the low-element wideband compact antenna of the present invention having a plurality of active elliptical elements mounted around a circle on the top surface of a circular reflective plate.
Figure 14B:
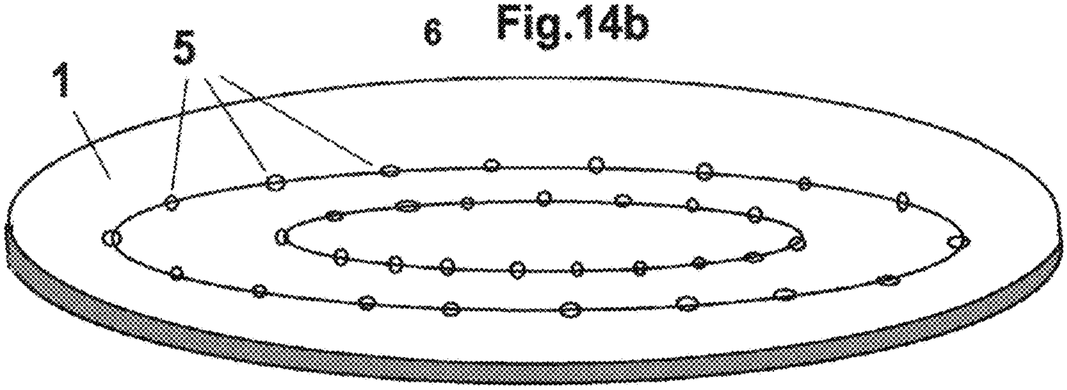
FIG. 14*b* is a top and front perspective view of a basic embodiment of the low element wideband compact antenna of the present invention showing two concentric circular templates for mounting elements of of two radiating elements on a circular reflective plate.
Figure 14C:
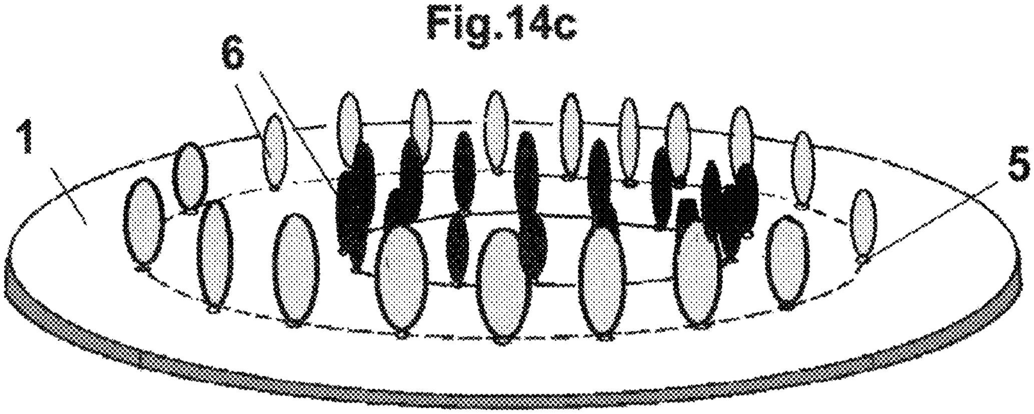
FIG. 14*c* is a top and front perspective view of an embodiment of the low-element antenna of the present invention having a plurality of radiation elements mounted in and around the concentric cirular template of the circular reflective plate.
Figure 15:
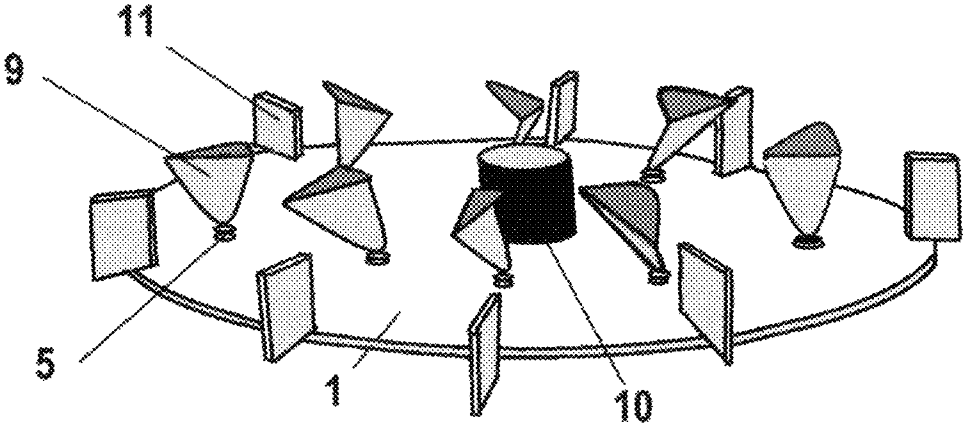
FIG. 15 is a top and front perspective view of an embodiment of the low-element wideband compact antenna of the present invention having exemplary eight L-shaped active elements located evenly around a circle pattern and located spaced around a vertical cylindrical passive element mounted at the center of a circular reflective plate, A plurality of rectangular passive elements are spaced evenly and mounted around the periphery of the reflective plate to serve as supplement passive directors of the signal transmission.
Figure 16:
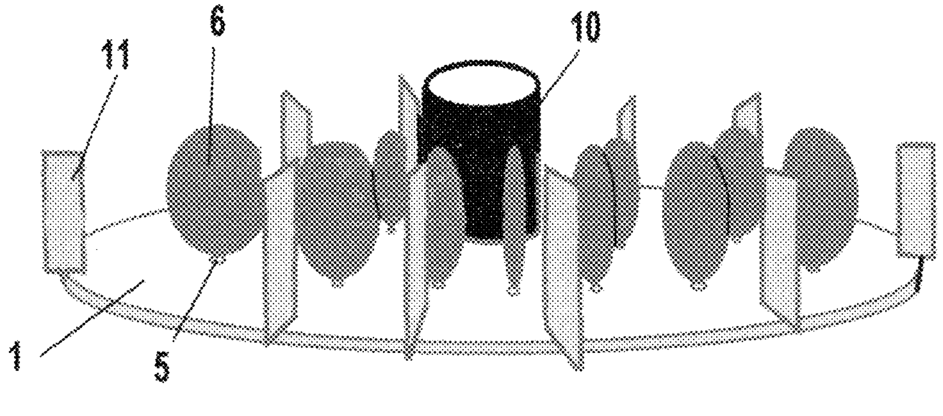
FIG. 16 is a top and front perspective view of an embodiment of the low-element wideband compact antenna of the present invention having exemplary 12 active elements in the form of circular disks located evenly in a circle spaced and around a cylindrical passive radiator mounted at the center of the circular reflective plate. The active circular elements are supplemented with a passive rectangular passive directors mounted around the periphery of the reflective plate.
Figure 17:
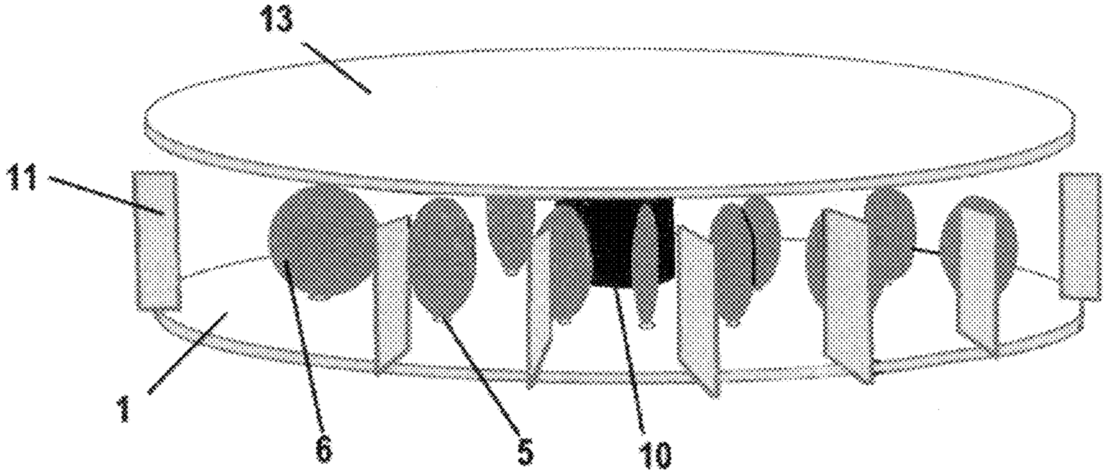
FIG. 17 is a top and front perspective view of another embodiment of the low-element wideband compact antenna according to the present invention with the structure shown in FIG. 16 provided with a circular reflective metal screen covering on top.

As shown in the graphs, the antenna has anisotropic radiation patterns in the azimuthal plane and in the plane perpendicular to it, where the radiation maxima are directed parallel on the reflecting surface. The simplest version of a low-element antenna, applicable in cases where the direction angle of the main maximum of the diagram is different from parallel on the reflecting surface, is shown in FIG. 14*a* in which D1 is the diameter of the grounding plane and D2 is the diameter of the circle on which the active elements are placed. The size of the circle for installing the elements is determined by their number, necessary to provide the required radiation pattern, and the elements should not be located closer than half the wave length of the upper frequency range from each other. The antenna array can be made as a combination of a plurality of radiator elements mounted on a reflecting surface along coaxial concentric curves of arbitrary shape such as concentric circles as shown in FIG. 14*b*, with respect to the center of the reflective plate. Such structures can be one, as shown in exemplary embodiment shown in FIG. 14*a*, or multiple ones as shown in FIG. 14*c* in which each of the active radiator element covers an intended individual frequency range. This design assumes that the smaller structure uses active elements on a single reflective surface makes it possible to create a broadband antenna without increasing the overall compact dimensions of the antenna; the choice of the radio frequency range can be achieved by connecting the transceiver to the appropriate structure. FIG. 15 shows an exemplary embodiment of a variant of the design of an 8-element antenna in which the active elements are in the form of L-shape bent ellipses. FIG. 16 shows a perspective view of another exemplary embodiment of the antenna in which the active elements are in the form of round disks in which rotation of the disks by 90 degrees around the vertical axis of the disk from the location shown in the figure would not affect the electrical parameters of the antenna. It is possible to install an additional protective plate or screen 13 on top of the radiator elements to provide a sandwich structure as shown in FIG. 17. The protective plate or screen 13 is parallel to the reflective surface 1. This sandwich structure not only provides more rigid mechanical strength to antenna that can resist vibration particularly when it is installed on a moving object or carrier, but also would increases the gain of the antenna in the direction of the main maximum up to 2.4 db.

Figure 18:
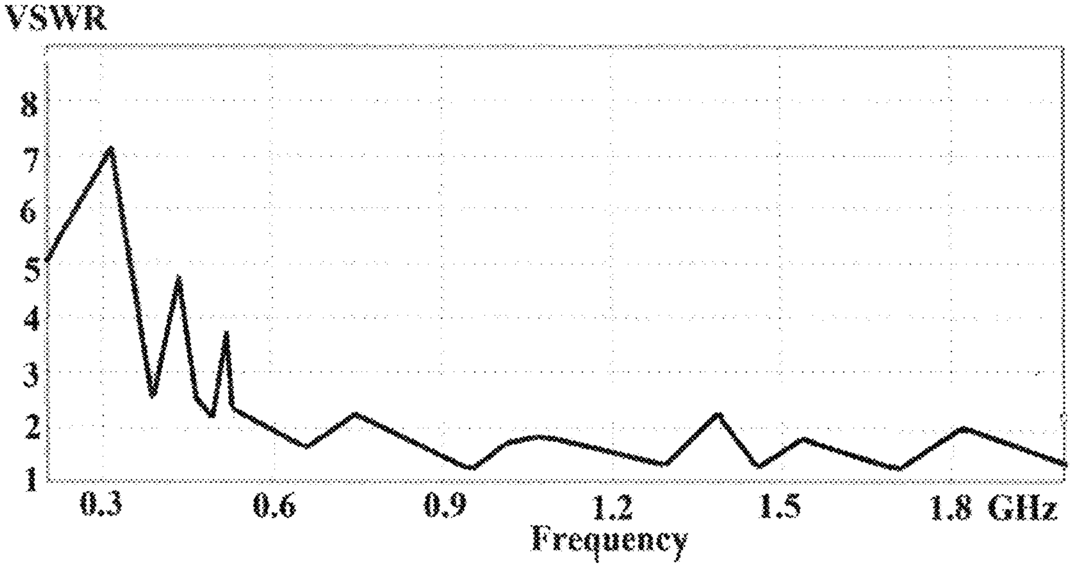
FIG. 18 is a VSWR versus frequency graph of the antenna shown in FIG. 17.
Figure 19:
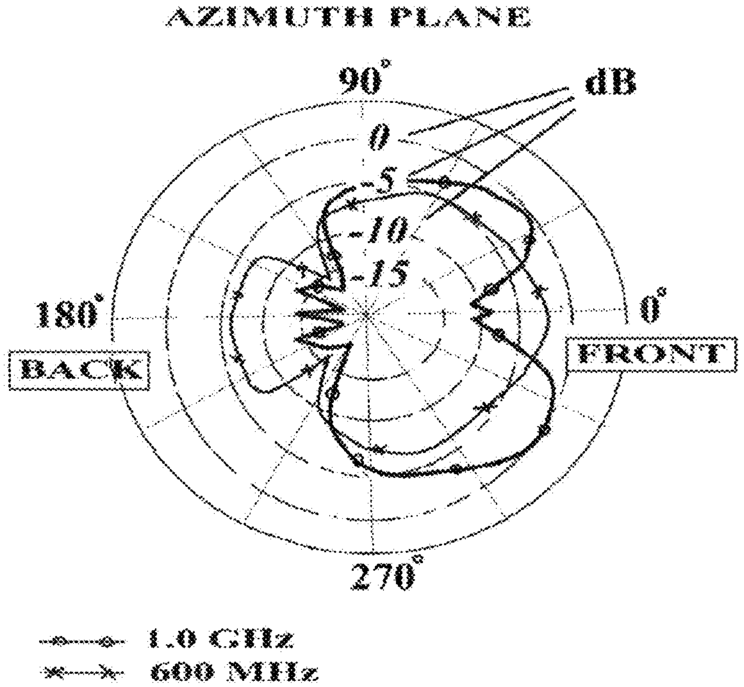
FIG. 19 is the radiation pattern in a horizontal azimuth plane of the antenna embodiment shown in FIG. 17.
Figure 20:
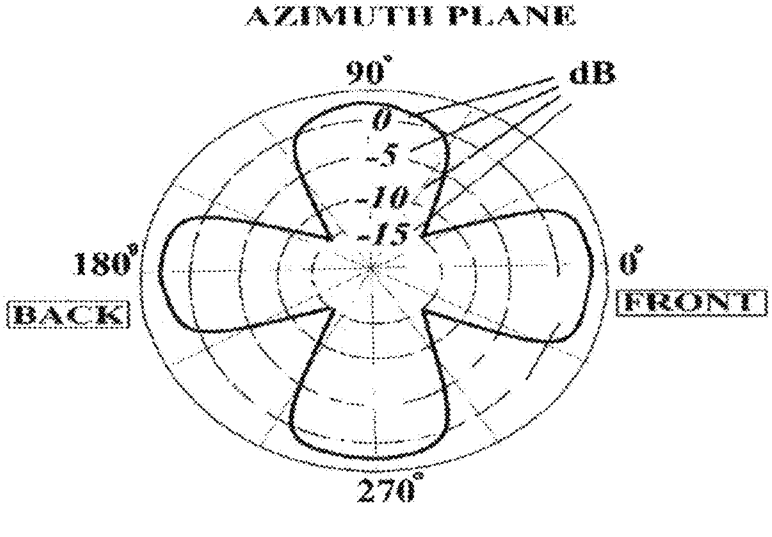
FIG. 20 is the radiation pattern of the antenna shown in FIG. 17 with only two active elements located on opposite sides of the reflective surface emitting.
Figure 21:
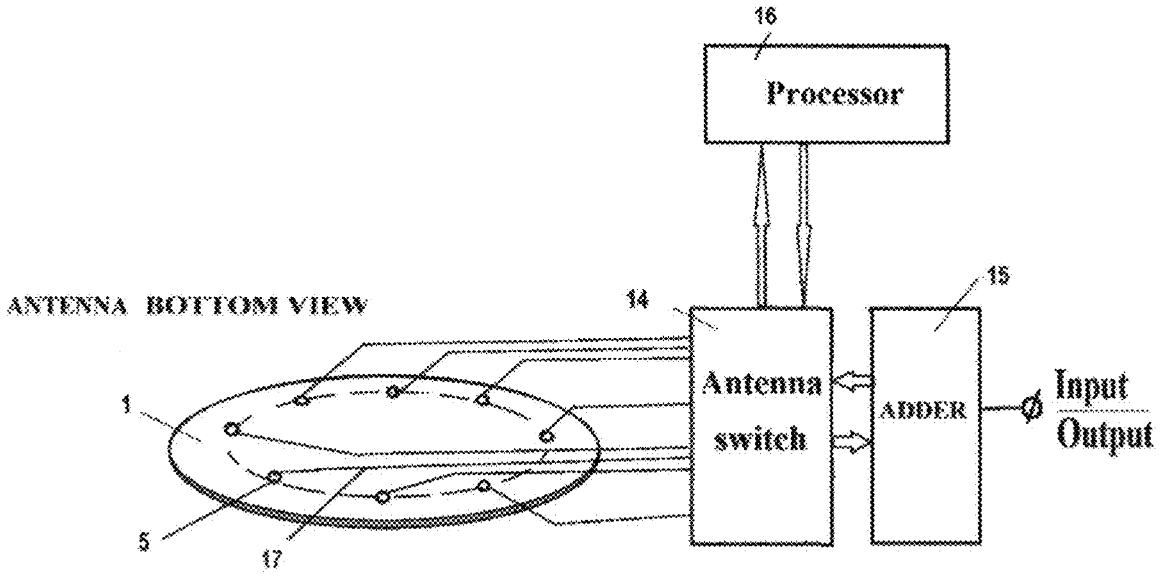
FIG. 21 is a block diagram of an overall antenna system with control according to the present invention.

The frequency properties of the embodiment of 12-element antenna are illustrated in the graph shown in FIG. 18, that the change in the standing wave ratio in the UHF range from 0.5 Ghz to 2 Ghz does not exceed 2. The radiation pattern in the azimuth plane of the 12-element antenna is shown in FIG. 19 when all elements are turned on for frequencies of 0.6 Ghz and 1 Ghz. Thus, it shows that the type of antenna patterns for each range is determined by the size of the reflective surface, as well as the type, number, and placement of active and passive elements. The type of radiation pattern and other parameters of the antenna can be adapted to the requirements by providing only part of the elements, at which point the radiation pattern becomes directional. FIG. 20 shows an example of the radiation pattern of a 12-element antenna, in which only two elements are connected at the same time, located on opposite sides of a circle of the outer diameter D2 and the remaining elements passive are disconnected from the signal cables. FIG. 21 shows the block diagram of an antenna's bottom view and the connections of the radiator elements to the control circuit, containing an antenna multichannel switch 14, an adder 15 and a processor 16. Active elements are connected to the inputs of the antenna switches 14, and the outputs of the antenna switches are connected to the adders 15. The length of the connecting cables 17 from each active element of the plurality of active radiator elements to the corresponding input of the adder 15 must be of equal length so as to exclude unwanted time shifts of signals from the element (or to the elements) when forming the radiation pattern. The channels of the multichannel switch 14 are controlled by the processor 16, depending on the required shape of the radiation pattern. The antenna of the present invention has significant advantages of being broadband; controllable in radiation pattern; compact in size; and devoid of delay lines such that it renders the possibility of adaptive control of the antenna parameters; radiation pattern, gain, and impedance depending on the state of the communication channel, interference, and environmental inference.

What is claimed is:

1. A broadband antenna comprising:

an electrically conductive circular metal plate having a cylindrical passive radiator element mounted at a center point of a top surface of said plate, a plurality of supplementary radiator elements mounted in an evenly spaced manner around a concentric circle pattern spaced and coaxial from said center point, adjacent supplementary radiator elements being spaced not less than half the wavelength of a predetermined minimum frequency of radio wave band of said antenna; a plurality of passive director elements mounted in an evenly spaced manner around periphery of said plate, and said supplementary radiator elements being connected in one point through signal input supply wires of equal length to an antenna switch controlled by a processor, and signal outputs of said antenna switch being connected to an adder by equal length output wires, whereby said antenna has an omnidirectional radiation pattern in an azimuth plane.

2. A broadband antenna according to claim 1 wherein said supplementary radiator elements comprise a plurality of L-shaped passive elements mounted in a concentric circle in an evenly spaced manner and spaced from said cylindrical passive radiator element located at the center of said conductive plate; and a plurality of rectangular disk shaped director elements mounted in an evenly spaced manner around the periphery of said conductive plate.

3. A broadband antenna according to claim 1 wherein said supplementary radiator elements comprise a plurality of round shaped disk elements mounted in a concentric circle in an evenly spaced manner and spaced from said cylindrical passive element at the center of said conductive plate; and a plurality of rectangular disk shaped director elements are mounted in an evenly spaced manner around the periphery of said conductive plate.

4. A broadband antenna according to claim 3 wherein a selected antenna signal radiation pattern is obtainable by providing varying selected sizes of said conductive plate.

5. A broadband antenna according to claim 3 wherein a selected antenna signal radiation pattern is obtainable by varying the number, type, and locations of said active elements, said passive elements, and said director elements.

6. A broadband antenna according to claim 1, including an additional conductive plate mounted on top and covering over said cylindrical passive element, said supplementary radiator elements, and said director elements.

* * * * *